US00RE42352E

(19) United States
(12) Reissued Patent
Fukuda et al.

(10) Patent Number: US RE42,352 E
(45) Date of Reissued Patent: May 10, 2011

(54) METHOD FOR PRODUCING ALUMINUM MAGNESIUM TITANATE SINTERED PRODUCT

(75) Inventors: Tsutomu Fukuda, Kakogawa (JP); Masahiro Fukuda, Uji (JP); Masaaki Fukuda, Kakogawa (JP); Toshinobu Yoko, Uji (JP); Masahide Takahashi, Uji (JP)

(73) Assignee: Ohcera Co., Ltd., Osaka (JP)

(21) Appl. No.: 12/285,248

(22) PCT Filed: Oct. 9, 2003

(86) PCT No.: PCT/JP03/12933

§ 371 (c)(1),
(2), (4) Date: Apr. 6, 2005

(87) PCT Pub. No.: WO2004/039747

PCT Pub. Date: May 13, 2004

Related U.S. Patent Documents

Reissue of:
(64) Patent No.: 7,166,552
Issued: Jan. 23, 2007
Appl. No.: 10/530,476
Filed: Apr. 6, 2005

(30) Foreign Application Priority Data

Nov. 1, 2002 (JP) ..... 2002-319934

(51) Int. Cl.
*C04B 35/478* (2006.01)

(52) U.S. Cl. ..... 501/136; 501/118; 501/134; 264/674; 264/681

(58) Field of Classification Search ..... 501/134, 501/136, 118; 264/674, 681
See application file for complete search history.

(56) References Cited

U.S. PATENT DOCUMENTS 4,307,198 A * 12/1981 Oda et al. ..... 501/119
(Continued)

FOREIGN PATENT DOCUMENTS

EP 506475 * 9/1992
(Continued)

OTHER PUBLICATIONS

Buscaglia et al; Decomposition of AI2TiO5 and AIMgTiO5 Ceranics, J. Am. Ceram. Soc. 81 (10)(1998)pp. 2645-2653.*

(Continued)

*Primary Examiner* — Karl E Group
(74) *Attorney, Agent, or Firm* — Kratz, Quintos & Hanson, LLP

(57) ABSTRACT

The present invention provides a process for preparing a sintered body comprising as a basic component aluminum magnesium titanate represented by the composition formula: $Mg_xAl_{2(1-x)}Ti_{(1+x)}O_5$ wherein the value of x is $0.1 \leqq x < 1$. The process comprises a step of sintering a formed product from a raw material mixture comprising 100 parts by weight, calculated on an oxide basis, of a mixture comprising a Mg-containing compound, an Al-containing compound and a Ti-containing compound at the same metal component ratio as the metal component ratio of Mg, Al and Ti in the above composition formula, and 1–10 parts by weight of an alkali feldspar represented by the composition formula: $(Na_yK_{1-y})AlSi_3O_8$ wherein the value of y is $0 \leqq y \leqq 1$.

According to the process of the present invention, a sintered body of aluminum magnesium titanate having stability in continuous use at high temperatures and excellent mechanical strength, while maintaining inherently low thermal expansibility of a sintered body of aluminum magnesium titanate, can be obtained.

8 Claims, 1 Drawing Sheet

U.S. PATENT DOCUMENTS

| | | | | |
|---|---|---|---|---|
| 5,008,222 | A * | 4/1991 | Kameda | 501/134 |
| 5,153,153 | A * | 10/1992 | Freudenberg et al. | 501/127 |
| 6,403,019 | B1 * | 6/2002 | Fukuda et al. | 264/658 |
| 6,620,751 | B1 * | 9/2003 | Ogunwumi | 501/134 |
| 2003/0015829 | A1 * | 1/2003 | Fukuda et al. | 264/674 |
| 2004/0092381 | A1 * | 5/2004 | Beall et al. | 501/134 |
| 2005/0181929 | A1 * | 8/2005 | Fukuda et al. | 501/127 |

FOREIGN PATENT DOCUMENTS

| | | | |
|---|---|---|---|
| EP | 1338581 | A1 * | 5/2003 |
| EP | 1652830 | | 5/2006 |
| JP | 4-280863 | * | 10/1992 |
| JP | 07025662 | * | 1/1995 |
| JP | 2002-145659 | * | 5/2002 |
| WO | 0238519 | * | 5/2002 |

OTHER PUBLICATIONS

International Search report dated Jan. 27, 2004.*

"Property and Application of Aluminum Titanate Ceramics", Foshan Ceramics (2003), vol. 10, No. 3, Serial 41;pp. 4-6 with English Abtract.*

"Aluminum Titanate Ceramics and Application", Shandong Ceramics,(2000) vol. 23, No. 2; with English Abstract.*

"New Development in Research of Aluminum Tianate Ceramics", Bulletin of the Chinese Ceramic Society (1999); No. 4, pp. 53-59 with English Abstract.*

"The Effect of Additives to the Property of Aluminum Tianate", Refractories (2001), col. 35, No. 2, pp. 87-88, with English Abstract.*

"Research of the Efeect of Different ASdditives to Coefficient of Thermal Expansion of Aluminum Titanate", J. of In. Mat. (2000), vol. 15, No. 3 pp. 438-440, with English Abstract.*

Cinese Office Action dated Jun. 30, 2006 with English Translation.*

Huang et al.: "Thermal and mechanical properties of aluminum titanate-mullite composites." J. Mater. Res., vol. 15, No. 2, Feb. 2000, pp. 357-363.

Supplementary European Search Report dated Apr. 10, 2007.

* cited by examiner

METHOD FOR PRODUCING ALUMINUM MAGNESIUM TITANATE SINTERED PRODUCT

Matter enclosed in heavy brackets [ ] appears in the original patent but forms no part of this reissue specification; matter printed in italics indicates the additions made by reissue.

TECHNICAL FIELD

The present invention relates to a process of producing a sintered body of aluminum magnesium titanate.

BACKGROUND ART

Aluminum magnesium titanate is a solid solution which has a complete solubility in the solid state throughout the entire composition region of aluminum titanate-magnesium titanate. A sintered body of the same has as low a coefficient of thermal expansion and as high a corrosion resistance as aluminum titanate sintered bodies. The melting point of aluminum magnesium titanate is, for example, about 1640° C. in a sintered body in which aluminum titanate and magnesium titanate are dissolved into each other at an approximately equivalent molar ratio. This temperature is lower than the melting point of aluminum titanate, about 1870° C., but is higher than the melting point of magnesium titanate, about 1600° C. Therefore, in general, the heat-resistant high temperature limit of aluminum magnesium titanate is lower than that of aluminum titanate, but is higher than that of magnesium titanate.

Aluminum titanate sintered bodies and magnesium titanate sintered bodies are constructed from the crystal grains having the pseudobrookite type crystal structure, and their coefficients of thermal expansion are anisotropic. For this reason, displacement at the crystal grain boundary tends to be caused when heated or cooled and micro cracks and apertures may be formed, leading to disadvantageously lowered mechanical strength. Since aluminum magnesium titanate has similar disadvantages, the strength of its sintered body is also insufficient. Particularly when used for an application in which high temperatures and heavy loads are applied, it cannot exhibit sufficient durability.

The lower limit of the temperature for synthesizing aluminum titanate is 1280° C., while the lower limit of the temperature for synthesizing magnesium titanate is 900° C. Both are unstable in the temperature region lower than their synthesizing temperatures. A solid solution of these compounds, aluminum magnesium titanate is unstable at a temperature lower than the synthesizing temperature region as well as aluminum titanate and magnesium titanate, and thus is tend to thermally decompose into $TiO_2$ (rutile) and $MgAl_2O_4$ (spinel) when continuously used in the decomposition temperature range for a long time. Herein, the decomposition temperature range of aluminum magnesium titanate differs depending on the dissolving ratio of aluminum titanate and magnesium titanate, but is normally within the temperature range of about 800–1280° C. For example, a sintered body of aluminum magnesium titanate in which aluminum titanate and magnesium titanate are dissolved at an approximately equivalent molar ratio, when continuously used for a long period in a temperature range of about 1100° C., thermally decomposes into $TiO_2$ (rutile) and $MgAl_2O_4$ (spinel) (Vincenzo Buscaglia et al. "Decomposition of $Al_2TiO_5$ and $Al_{2(1-x)}Mg_xTi_{(1+x)}O_5$ Ceramics", Journal of American Ceramic Society, 1998, 81 [10], pp. 2645–2653). For this reason, a sintered body of aluminum magnesium titanate cannot be continuously used in such a decomposition temperature range.

DISCLOSURE OF THE INVENTION

A primary object of the present invention is to provide a sintered body of aluminum magnesium titanate having excellent mechanical strength and stability in continuous use at high temperatures, as well as inherently low thermal expansibility of sintered body of aluminum magnesium titanate.

The inventors of the present invention carried out extentsive research to overcome the foregoing problems of known art. They consequently found that a sintered body of aluminum magnesium titanate having high mechanical strength, a low coefficient of thermal expansion, excellent decomposition resistance and fire resistance can be obtained by using a raw material mixture prepared by adding a specific alkali feldspar to a mixture comprising a Mg-containing compound, an Al-containing compound and a Ti-containing compound. The present invention was accomplished on the basis of this finding.

Specifically, the present invention provides the following processes for producing a sintered body of aluminum magnesium titanate:

1. A process for producing a sintered body comprising as a basic component aluminum magnesium titanate represented by the composition formula:

$$Mg_xAl_{2(1-x)}Ti_{(1+x)}O_5$$

wherein the value of x is $0.1 \leqq x < 1$, the process comprising a step of sintering a formed product from a raw material mixture comprising the ingredients (i) and (ii) below:

(i) 100 parts by weight, calculated on an oxide basis, of a mixture comprising a Mg-containing compound, an Al-containing compound and a Ti-containing compound at the same metal component ratio as the metal component ratio of Mg, Al and Ti in the composition formula, (ii) 1–10 parts by weight of an alkali feldspar represented by the composition formula:

$$(Na_yK_{1-y})AlSi_3O_8$$

wherein the value of y is $0 \leqq y \leqq 1$.

2. A process of producing a sintered body of aluminum magnesium titanate according to item 1, wherein the value of x in the composition formula: $Mg_xAl_{2(1-x)}Ti_{(1+x)}O_5$ is $0.25 \leqq x \leqq 0.75$.

3. A process of producing a sintered body of aluminum magnesium titanate according to item 1 or 2, wherein the value of y in the composition formula: $(Na_yK_{1-y})AlSi_3O_8$ is $0.15 \leqq y \leqq 0.85$.

4. A process of producing a sintered body of aluminum magnesium titanate according to any one of items 1–3, wherein a sintering temperature is 1000–1700° C.

5. An sintered body of aluminum magnesium titanate which is obtainable by the process of any one of claims 1–4.

The process of the present invention is a process for preparing a sintered body comprising as a basic component aluminum magnesium titanate represented by the composition formula: $Mg_xAl_{2(1-x)}Ti_{(1+x)}O_5$ (wherein the value of x is $0.1 \leqq x < 1$), and comprises a step of sintering a formed product from a raw material mixture comprising the ingredients (i) and (ii) below:

(i) 100 parts by weight, calculated on an oxide basis, of a mixture comprising a Mg-containing compound, an Al-containing compound and a Ti-containing compound at the same metal component ratio as the metal component ratio of Mg, Al and Ti in the composition formula, (ii) 1–10 parts by weight of an alkali feldspar represented by the composition formula:

$$(Na_yK_{1-y})AlSi_3O_8$$

wherein the value of y is $0 \leqq y \leqq 1$.

In the above composition formula: $Mg_xAl_{2(1-x)}Ti_{(1+x)}O_5$, the value of x is $0.1 \leqq x < 1$, preferably $0.25 \leqq x \leqq 0.75$.

Any Mg-containing compound, Al-containing compound and Ti-containing compound can be used as a raw material without limitation insofar as it is a substance which can synthesize aluminum magnesium titanate by sintering. As a Mg-containing compound, an Al-containing compound and a Ti-containing compound, a different compound may be used for each, or a compound comprising two or more of the metal components may be used. These compounds used can be normally suitably selected from those used as a raw material for forming ceramics such as alumina ceramics, titania ceramics, magnesia ceramics, aluminum titanate ceramics, magnesium titanate ceramics, spinel ceramics, aluminum magnesium titanate ceramics and the like. For example, $Al_2O_3$, $TiO_2$, MgO, and like oxides; $MgAl_2O_4$, $Al_2TiO_5$, various oxide having spinel-structures comprising Mg and Ti, and like complex oxides comprising two or more types of metal components; compounds (carbonates, nitrates, sulfates, etc.) comprising one or more types of metal components selected from the group consisting of Al, Ti and Mg; among others, can be used.

Mg-, Al- and Ti-containing compounds can be mixed at such a ratio that the ratio of the metal components contained in these compounds is the same ratio as that of the metal components Mg, Al and Ti in the above aluminum magnesium titanate represented by the composition formula: $Mg_xAl_{2(1-x)}Ti_{(1+x)}O_5$ (wherein x is the same as described above). By using the above compounds in such a proportion, it is possible to obtain a sintered body comprising as a basic component an aluminum magnesium titanate which has the ratio of the metal components equal to the ratio of the metal components in a mixture used as a raw material.

In the present invention, it is necessary to further add an alkali feldspar as an additive to the above mixture comprising a Mg-containing compound, an Al-containing compound and a Ti-containing compound.

Alkali feldspar used herein is represented by the composition formula: $(Na_yK_{1-y})AlSi_3O_8$. Such an alkali feldspar is a sintering aid for aluminum magnesium titanate, and also serves to add a Si component to aluminum magnesium titanate. In the above composition formula, the value of y is $0 \leqq y \leqq 1$, preferably $0.1 \leqq y \leqq 1$, more preferably $0.15 \leqq y \leqq 0.85$. The alkali feldspar with the value of y in this range has a low melting point, and is particularly effective in prompting sintering of aluminum magnesium titanate.

The amount of an alkali feldspar used may be about 1–10 parts by weight, preferably about 3–5 parts by weight, relative to 100 parts by weight, calculated on an oxide basis, of the total amount of the Mg-, Al- and Ti-containing compounds used as raw materials. The amounts of the raw material compounds in this case are those calculated the Mg-, Al- and Ti-containing compounds as MgO, $Al_2O_3$ and $Ti_2O$, respectively.

According to the present invention, the above specific alkali feldspar is added to a mixture comprising a Mg-containing compound, an Al-containing compound and a Ti-containing compound as an additive and this mixture is formed into a predetermined shape to be sintered, whereby an sintered body of aluminum magnesium titanate with high mechanical strength and resistance to thermal decomposition can be obtained.

The reason why the sintered body with high mechanical strength and resistance to thermal decomposition can be obtained by the process of the present invention is undetermined, but is presumably as follows:

Thus, the alkali feldspar used in the process of the present invention becomes in the liquid state around a temperature at which aluminum magnesium titanate is synthesized. By adding such an alkali feldspar to the raw material mixture and sintering the same, a reaction which synthesizes aluminum magnesium titanate is caused in the liquid phase, forming a compact sintered body. Because this additive has been dissolved into aluminum magnesium titanate in the first sintering step, the additive does not become liquid when heating again the formed sintered body. The strength of the sintered body is therefore not lowered. In addition, when a Si component contained in an alkali feldspar dissolves into the aluminum magnesium titanate crystal lattice in sintering step for synthesizing aluminum magnesium titanate, it dissolves preferentially into the crystal system of aluminum titanate rather than into the crystal system of magnesium titanate. This is because aluminum titanate has greater distortion in the octahedron structure constituting the crystal than magnesium titanate among pseudobrookite type crystal structures, and hence the crystallographic anisotropy is significantly high and crystal structure is unstable. Therefore, Si dissolving into aluminum magnesium titanate crystal lattice dissolves into the crystal system of aluminum titanate, and occupies mainly the Al sites. At this time, tetravalent Si, instead of solely replacing the Al sites which originally keep their electrical charge balance by being trivalent, make pairs with divalent Mg present in the system to be sexivalent with both Si and Mg in total and replace the neighboring two Al atoms (sexivalent in total) more easily. This can be also explained from the correlation of the ion radius of each cation. That is, since the ion radii of $Si^{4+}$ and $Mg^{2+}$ are 0.54 Å and 0.86 Å, respectively, and the mean ion radius of them is thus 0.70 Å, which is approximate to the ion radius of $Al^{3+}$, 0.68 Å. Accordingly, the occupation of the Al sites by the pair of Si and Mg can be thought to be a dissolving state more reasonable in energy than replacing solely by Si. Thus, it is considered that aluminum magnesium titanate can inhibit the ion diffusion between the cations even at high temperatures by the use of Si and Mg in combination, thus having a stable crystal structure.

From the reasons mentioned above, the obtained sintered body of aluminum magnesium titanate is thought to show improved mechanical strength and very high resistance to thermal decomposition due to stabilization of the crystal structure.

A raw material mixture prepared by adding alkali feldspar to a mixture comprising a Mg-containing compound, an Al-containing compound and a Ti-containing compound may be sufficiently mixed and pulverized to an appropriate grain size, and then formed into a predetermined shape.

The mixing and pulverizing process of the raw material mixture is not particularly restricted and may be conducted according to a known method. For example, mixing and pulverizing can be conducted by using a ball mill, stirred media mill, etc.

The degree of pulverization of the raw material mixture is not particularly limited. It is normally pulverized to the grain size of about 1 μm or less, preferably to as small grain size as possible, as long as secondary particles are not formed.

A forming aid, if necessary, may be further added to the raw material mixture. As a forming aid, a known substance which has been used may be used depending on the forming process.

As such a forming aid, for example, polyvinyl alcohol, microwax emulsion, carboxymethyl cellulose and like binders, stearic acid emulsion and like mold releasing agents, n-octyl alcohol, octylphenoxy ethanol and like antifoaming agents, diethylamine, triethylamine and like deflocculants can be used.

The amount of a forming aid used is not particularly limited either, and may be suitably selected from the range of amounts for a known one depending on the forming process. For example, when forming is conducted by slip casting, it is possible to use about 0.2–0.6 parts by weight of a binder, about 0.5–1.5 parts by weight of a deflocculant, about 0.2–0.7 parts by weight of a mold releasing agent (solid basis), and about 0.5–1.5 parts by weight of an antifoaming agent, relative to 100 parts by weight, calculated on an oxide basis, of the total amount of the Mg- , Al- and Ti-containing compounds used as raw materials.

The forming process of the raw material mixture is not particularly limited, and, for example, press molding, sheet casting, slip casting, extrusion, injection molding, CIP molding and like known forming processes may be suitably employed.

The sintering temperature may be any temperature which is necessary for aluminum magnesium titanate to be synthesized. Normally, it may be about 1000–1700° C., preferably about 1250–1450° C.

The atmosphere for sintering is not particularly limited, and may be any of an oxygen-containing atmosphere such as air, a reducing atmosphere and an inert atmosphere, which are heretofore employed.

The sintering time is not particularly limited, and may be such that the formed product is sufficiently sintered, depending on the shape of the formed product, etc. Normally, the product may be maintained in the above temperature range for about 1–10 hours.

The heating rate and cooling rate in sintering are not particularly limited, and may be suitably selected so that no cracks are formed in the sintered body. For example, to sufficiently remove water, organic binder and the like contained in the raw material, it is preferable to raise the temperature not abruptly but gradually. In addition, prior to heating to the above sintering temperature, calcination can be conducted, if necessary, by slowly heating in a temperature range of about 700–1000° C. for about 10–30 hours. By this calcination, when aluminum magnesium titanate is synthesized, the stress in the sintered body, which causes cracks, can be mitigated to inhibit the formation of cracks, providing a compact and uniform sintered body.

The sintered body of aluminum magnesium titanate obtained by the process of the present invention is a sintered body which comprises the aluminum magnesium titanate represented by the above composition formula: $Mg_xAl_{2(1-x)}Ti_{(1+x)}O_5$ (wherein the value of x is $0.1 \leqq x < 1$) as a basic component and in which the Si component contained in the alkali feldspar as an additive is dissolved into the crystal lattice of aluminum magnesium titanate. Such a sintered body has excellent resistance to thermal decomposition because it has both high mechanical strength and low coefficient of thermal expansion and its crystal structure is stabilized. As a result, the thermal decomposition reaction of aluminum magnesium titanate is inhibited and therefore the sintered body can be stably used at a temperature ranging from room temperature to as high as about 1600° C. The mechanical strength is very high compared to a conventional sintered body of aluminum magnesium titanate as it can have mechanical strength up to about 70 MPa.

Furthermore, according to the process of the present invention, sintering can be conducted without forming cracks, providing a compact sintered body. Accordingly, the obtained sintered body is given good resistance to thermal shock and corrosion resistance.

Using the above excellent characteristics, the sintered body of aluminum magnesium titanate obtained by the process of the present invention can be used as, for example, an automobile exhaust filter, an automobile exhaust filter for DPF (diesel particulate filter) apparatus, etc. Further, using its low thermal expansibility, it can also be effectively used as a surface plate for printing process in the LSI manufacturing process, etc. It can also be applied for the furnace walls of high-temperature furnaces and the furnace walls of refuse incinerators etc.

As stated above, the sintered body of aluminum magnesium titanate obtained by the preparation processes of the present invention has high mechanical strength and resistance to thermal decomposition, while maintaining the inherently low coefficient of thermal expansion of aluminum magnesium titanate, and can be stably used in the temperature range of 800° C.–1280° C. in which a known sintered body of aluminum titanate cannot be used for a long period continuously. In addition, the sintered body of aluminum magnesium titanate also has good refractoriness, and can be used in a high temperature range of 1500° C. or higher in which magnesium titanate cannot be used.

BEST MODE FOR CARRYING OUT THE INVENTION

Figure 1:
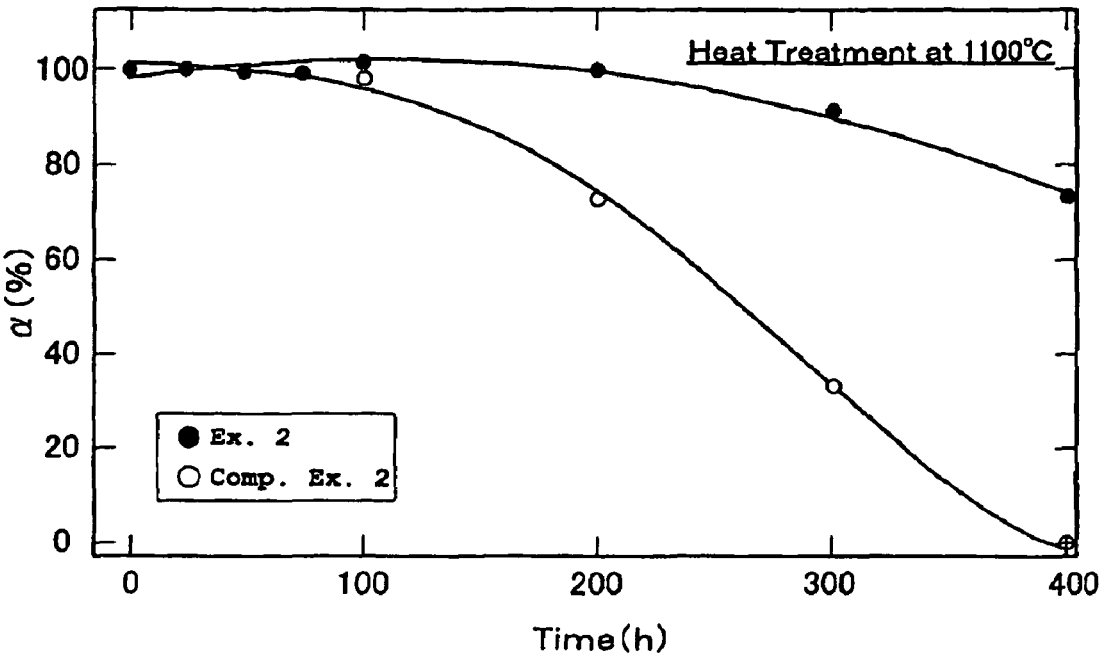
FIG. 1 is a graph showing the change of residual aluminum magnesium titanate percentage α (%) over time in the sintered bodies obtained in Example 2 and Comparative Example 2 placed in the atmosphere at 1100° C.

The present invention is described below in more details with reference to Examples.

EXAMPLE 1

To 100 parts by weight of a mixture comprising 26.7% by weight (20 mol %) of sinterable α-alumina, 62.8% by weight (60 mol %) of titanium oxide in anatase form and 10.5% by weight (20 mol %) of a natural mineral, magnesium oxide in periclase form, were added 4 parts by weight of an alkali feldspar represented by the chemical formula: $(Na_{0.6}K_{0.4})AlSi_3O_8$, 0.25 parts by weight of polyvinyl alcohol as a binder, 1 part by weight of diethylamine as a deflocculant, and 0.5 parts by weight of polypropylene glycol as an antifoaming agent. The mixture was mixed using a ball mill for 3 hours, and then dried using a dryer at 120° C. for at least 12 hours, giving a raw material powder.

The resulting raw material powder was pulverized to about 150 mesh and pressed under a pressure of 60 MPa, giving a molded product measuring 100 mm×100 mm×10 mm.

This molded product was sintered according to the heating pattern 1 below in the atmosphere and thereafter left to cool, giving a sintered body of aluminum magnesium titanate.

(Heating Pattern 1)

from room temperature to 140° C. for 21 hours maintained at 140° C. for 14 hours (water evaporation)

from 140 to 216° C. for 21 hours (gradual evaporation of water inside the sample)
from 216 to 295° C. for 16 hours (organic binder combustion)
from 295 to 379° C. for 46 hours (magnesium hydroxide removal)
from 379 to 458° C. for 20 hours (organic binder combustion)
from 458 to 700° C. for 28 hours (residual carbon combustion)
maintained at 700° C. for 3 hours
from 700 to 1000° C. for 26 hours (calcination)
from 1000 to 1250° C. for 2 hours
maintained at 1250° C. for 2 hours (sintering)

A 3 mm×4 mm×40 mm sample was cut from the sintered body of aluminum magnesium titanate obtained by the above process. The surface of the sample was polished and the arris of the sample was ground (removal of sharp edges), and then its three-point bending strength was determined. As a result, the three-point bending strength was 69.3±3.1 MPa.

As Comparative Example 1, a sintered body of aluminum magnesium titanate was obtained in the same manner as the above process except that no alkali feldspar was added. The three-point bending strength of this sintered body was determined in the same process. The result was 21.1±2.1 MPa.

It can be seen from these results that the sintered body of aluminum magnesium titanate obtained by the process of the present invention has very high mechanical strength compared to a known sintered body of aluminum magnesium titanate.

EXAMPLE 2

To 100 parts by weight of a mixture comprising 37.3% by weight (25 mol %) of an oxide having a spinel structure and represented by the chemical formula: $MgAl_2O_4$ and 62.7% by weight (75 mol %) of titanium oxide in anatase form were added 4 parts by weight of an alkali feldspar represented by the chemical formula: $(Na_{0.6}K_{0.4})AlSi_3O_8$, 0.25 parts by weight of polyvinyl alcohol as a binder, 1 part by weight of diethylamine as a deflocculant and 0.5 parts by weight of polypropylene glycol as an antifoaming agent. The mixture was mixed using a ball mill for 3 hours, and then dried using a dryer at 120° C. for at least 12 hours, giving a raw material powder.

The resulting raw material powder was pulverized to about 150 mesh and pressed under a pressure of 60 MPa, giving a molded product measuring 100 mm×100 mm×10 mm.

This molded product was sintered in the atmosphere according to the heating pattern 2 below and then left to cool, giving a sintered body of aluminum magnesium titanate.

(Heating Pattern 2)

from room temperature to 140° C. for 21 hours
maintained at 140° C. for 14 hours (water evaporation)
from 140 to 216° C. for 21 hours (gradual evaporation of water inside the sample)
from 216 to 295° C. for 16 hours (organic binder combustion)
from 295 to 379° C. for 46 hours (magnesium hydroxide removal)
from 379 to 458° C. for 20 hours (organic binder combustion)
from 458 to 700° C. for 28 hours (residual carbon combustion)
maintained at 700° C. for 3 hours
from 700 to 1000° C. for 26 hours (calcination)
from 1000 to 1400° C. for 3 hours
maintained at 1400° C. for 4 hours (sintering)

The three-point bending strength of the resulting sintered body of aluminum magnesium titanate was determined in the same manner as Example 1. The result was 28.2±1.7 MPa.

In contrast, As Comparative Example 2, a sintered body of aluminum magnesium titanate was obtained in the same manner as the above process except that no alkali feldspar was added. The three-point bending strength of this sintered body was determined by the same process. The result was 9.6±0.6 MPa.

It can be seen from these results that the sintered body of aluminum magnesium titanate obtained by the process of the present invention has very high mechanical strength compared to a known sintered body of aluminum magnesium titanate.

Meanwhile, a 5 mm×5 mm×20 mm sample was cut from each of the sintered body of aluminum magnesium titanate of Example 2 and the sintered body of Comparative Example 2. After the surfaces of the samples were polished, the coefficients of thermal expansion of the samples were determined at the heating rate of 20° C./min. The results are shown in Table 1 below.

TABLE 1

| Temperature ° C. | Percentage of thermal expansion (ΔL/L) % | Coefficient of thermal expansion $\times 10^{-06}$ (1/K) |
|---|---|---|
| Example 2 Aluminum magnesium titanate with additive (x = 0.5) | | |
| 50 | 0.002 | 0.57 |
| 150 | 0.007 | 0.52 |
| 250 | 0.017 | 0.76 |
| 350 | 0.033 | 0.99 |
| 450 | 0.051 | 1.18 |
| 550 | 0.073 | 1.38 |
| 650 | 0.100 | 1.59 |
| 750 | 0.138 | 1.90 |
| 850 | 0.191 | 2.30 |
| Comparative Example 2 Aluminum magnesium titanate with no additive (x = 0.5) | | |
| 50 | −0.001 | −0.44 |
| 150 | −0.003 | −0.20 |
| 250 | 0.001 | 0.04 |
| 350 | 0.005 | 0.16 |
| 450 | 0.015 | 0.36 |
| 550 | 0.029 | 0.55 |
| 650 | 0.045 | 0.72 |
| 750 | 0.070 | 0.97 |
| 850 | 0.109 | 1.32 |

As can be seen from the results shown above, the sintered body of aluminum magnesium titanate obtained in Example 2 has a very low coefficient of thermal expansion as the sintered body of aluminum magnesium titanate obtained in Comparative Example 2. This demonstrates that the sintered body in Example 2 maintains inherently low thermal expansibility of aluminum magnesium titanate.

Next, a 10 mm×10 mm×10 mm samples was cut from each of the sintered body of aluminum magnesium titanate of Example 2 and the sintered body of aluminum magnesium titanate of Comparative Example 2. The samples were placed in the atmosphere at 1100° C. and their changes of residual aluminum magnesium titanate percentage α(%) over time were determined.

The residual aluminum magnesium titanate percentage was determined by X-ray diffraction measurement (XRD) by the following manner.

First, since $TiO_2$ (rutile) and $MgAl_2O_4$ (spinel) are formed when aluminum magnesium titanate thermally decomposes, the ratio R of the diffraction intensity of aluminum magnesium titanate to that of rutile was determined by the formula below using the integrated intensity ($I_{T102(110)}$) of the diffraction peak of the (110) face of rutile and the integrated intensity ($I_{MAT(023)}$) of the diffraction peak of the (023) face of aluminum magnesium titanate:

$$R=I_{MAT(023)}/\{I_{MAT(023)}+I_{TiO2(110)}\}$$

Further, the ratio $R_0$ of the diffraction intensity of aluminum magnesium titanate to that of rutile for the sintered body prior to conducting heat treatment at 1100° C. was also determined by the same manner.

Second, using R and $R_o$, determined by the above manner, the residual aluminum magnesium titanate percentage α(%) was determined by the following formula:

$$\alpha=(R/R_0)\times 100$$

The changes of the residual aluminum magnesium titanate percentage α(%) of the sintered bodies of Example 2 and Comparative Example 2 over time are shown in a graph of FIG. 1.

As can be seen from FIG. 1, the sintered body of aluminum magnesium titanate of Example 2 can maintain a high value of the residual aluminum magnesium titanate percentage for a long period, compared with the sintered body of aluminum titanate of Comparative Example 2 obtained without adding an alkali feldspar, when left under a high temperature condition of 1100° C. It can be known from this result that the sintered body of Example 2 has excellent resistance to thermal decomposition.

EXAMPLES 3–8

Sinterable α-alumina, titanium oxide in anatase form and magnesium oxide in periclase form were mixed in the proportion shown in Table 2 below, giving a raw material mixture.

TABLE 2

| | Percentage of raw materials in mol % | | |
|---|---|---|---|
| | $Al_2O_3$ | $TiO_2$ | MgO |
| Example 3 | 43 | 52 | 5 |
| Example 4 | 33 | 56 | 11 |
| Example 5 | 25 | 58 | 17 |
| Example 6 | 15 | 62 | 23 |
| Example 7 | 9 | 64 | 27 |
| Example 8 | 2 | 66 | 32 |

To 100 parts by weight of the obtained mixture were added 4 parts by weight of an alkali feldspar represented by the chemical formula: $(Na_{0.6}K_{0.4})AlSi_3O_8$, 0.25 parts by weight of polyvinyl alcohol as a binder, 1 part by weight of diethylamine as a deflocculant and 0.5 parts by weight of polypropylene glycol as an antifoaming agent. The mixture was mixed using a ball mill for 3 hours, and then dried using a dryer at 120° C. for at least 12 hours, giving a raw material powder.

The resulting raw material powder was pulverized to about 150 mesh and pressed under a pressure of 60 MPa, giving a molded product measuring 100 mm×100 mm×10 mm.

This molded product was sintered in the atmosphere under the same conditions as the heating conditions (heating pattern 2) in Example 2 and then left to cool, giving a sintered body of aluminum magnesium titanate.

A 3 mm×4 mm×40 mm sample was cut from each of the obtained sintered bodies of aluminum magnesium titanate. After the surfaces of the samples were polished and their arrises were ground (removal of sharp edges), their three-point bending strength were determined.

Meanwhile, a 5 mm×5 mm×20 mm sample was cut from each of the sintered bodies. After the surfaces of the samples were polished, their coefficients of thermal expansion were determined based on the expansion in the longitudinal direction when they were heated from 50° C. to 800° C. at the heating rate of 20° C./min.

The results are shown in Table 3 below. The measurement results of the sintered bodies of Examples 1, 2 and Comparative Examples 1, 2 are also described in Table 3.

Furthermore, the value of X in the composition formula: $Mg_xAl_{2(1-x)}Ti_{(1+x)}O_5$ is also described in Table 3.

TABLE 3

| | Value of X | Three-point bending strength (±standard deviation) Mpa | Coefficient of thermal expansion $\times 10^{-06}$ (l/K) |
|---|---|---|---|
| Heating pattern 1 | | | |
| Example 1 | 0.5 | 69.3(±3.1) | 2.6 |
| Comparative Example 1 | 0.5 | 21.1(±2.1) | 2.4 |
| Heating pattern 2 | | | |
| Example 2 | 0.5 | 28.2(±1.7) | 1.9 |
| Example 3 | 0.1 | 45.6(±1.5) | 0.3 |
| Example 4 | 0.25 | 38.6(±1.1) | 1.0 |
| Example 5 | 0.4 | 42.8(±2.2) | 1.7 |
| Example 6 | 0.6 | 47.4(±1.6) | 1.6 |
| Example 7 | 0.75 | 43.4(±1.9) | 2.2 |
| Example 8 | 0.95 | 51.0(±1.6) | 2.4 |
| Comparative Example 2 | 0.5 | 9.6(±0.6) | 1.7 |

As can be seen from the results shown above, the sintered bodies of Examples 1–8 have excellent mechanical strength, while maintaining inherently low coefficient of thermal expansion of aluminum magnesium titanate.

Further, the changes of the residual aluminum magnesium titanate percentage α(%) over time in the sintered bodies when placed in the atmosphere at 1100° C. were determined by the same manner as Example 2. The residual aluminum magnesium titanate percentage α(%) of the sintered bodies after 300 hours have passed and 400 hours have passed is shown in Table 4 below. In Table 4, the measurement results of the sintered bodies of Example 2 and Comparative Example 2 are also described.

TABLE 4

| | Residual aluminum magnesium titanate percentage α(%) | |
|---|---|---|
| | After 300 hours have passed | After 400 hours have passed |
| Example 2 | 95.9 | 78.6 |
| Example 3 | 93.1 | 85.6 |
| Example 4 | 98.6 | 97.4 |
| Example 5 | 99.8 | 95.3 |
| Example 6 | 97.8 | 94.1 |
| Example 7 | 100 | 98.4 |
| Example 8 | 100 | 100 |
| Comparative Example 2 | 34.8 | 0 |

As can be seen from the results shown above, the sintered bodies of the above Examples have excellent resistance to thermal decomposition.

The invention claimed is:

1. A process for producing a sintered body comprising as a basic component aluminum magnesium titanate represented by the composition formula:

$$Mg_xAl_{2(1-x)}Ti_{(1+x)}O_5$$

wherein the value of x is $0.1 \leqq x < 1$, the process comprising a step of sintering a formed product from a raw material mixture comprising the ingredients (i) and (ii) below:

(i) 100 parts by weight, calculated on an oxide basis, of a mixture comprising a Mg-containing compound, an Al-containing compound and a Ti-containing compound at the same metal component ratio as the metal component ratio of Mg, Al and Ti in the composition formula, (ii) 1–10 parts by weight of an alkali feldspar represented by the composition formula:

$$(Na_yK_{1-y})AlSi_3O_8$$

wherein the value of y is $0 \leqq y \leqq 1$.

2. A process of producing a sintered body of aluminum magnesium titanate according to claim 1, wherein the value of x in the composition formula: $Mg_xAl_{2(1-x)}Ti_{(1+x)}O_5$ is $0.25 \leqq x \leqq 0.75$.

3. A process of producing a sintered body of aluminum magnesium titanate according to claim 1, wherein the value of y in the composition formula: $(Na_yK_{1-y})AlSi_3O_8$ is $0.15 \leqq y \leqq 0.85$.

4. A process of producing a sintered body of aluminum magnesium titanate according to claim 1, wherein a sintering temperature is 1000–1700° C.

5. A sintered body of aluminum magnesium titanate which is obtainable by the process of claim 1.

*6. A sintered body of aluminum magnesium titanate comprising, calculated on an oxide basis, the following amounts of components (i) to (v):*

*(i) 100 parts by weight of aluminum magnesium titanate represented by the composition formula: $Mg_xAl_{2(1-x)}Ti_{(1+x)}O_5$ wherein the value of x is $0.1 \leqq x < 1$,*

*(ii) 0.18 to 1.95 parts by weight of $Al_2O_3$;*

*(iii) 0.65 to 6.87 parts by weight of $SiO_2$;*

*(iv) 0 to 1.18 parts by weight of $Na_2O$; and*

*(v) 0 to 1.69 parts by weight of $K_2O$, and*

*the amounts of Si, Na and K contained in the sintered body, calculated as $SiO_2$, $Na_2O$ and $K_2O$ respectively, satisfy the following relation:*

$$(Na_2O+K_2O)/SiO_2=0.172 \text{ to } 0.261.$$

*7. The sintered body of aluminum magnesium titanate according to claim 6 wherein Si dissolves into the crystal system of aluminum titanate and occupies mainly Al site.*

*8. The sintered body of aluminum magnesium titanate according to claim 6 wherein a pair of Si and Mg replaces neighboring two Al atoms.*

* * * * *